US012611864B2

(12) United States Patent
Kango et al.

(10) Patent No.: US 12,611,864 B2
(45) Date of Patent: Apr. 28, 2026

(54) PRINTING APPARATUS, METHOD FOR CONTROLLING PRINTING APPARATUS, AND STORAGE MEDIUM HAVING FIRST AND SECOND CAPS CAPPING A LIQUID EJECTION NOZZLE AND ASSOCIATED RECOVERY OPERATIONS

(71) Applicant: CANON KABUSHIKI KAISHA, Tokyo (JP)

(72) Inventors: Hiroto Kango, Tokyo (JP); Toshimitsu Danzuka, Tokyo (JP); Rie Takekoshi, Kanagawa (JP); Akihiro Tomida, Kanagawa (JP); Keita Ishimi, Kanagawa (JP); Akiko Aichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 18/512,995

(22) Filed: Nov. 17, 2023

(65) Prior Publication Data

US 2024/0165954 A1 May 23, 2024

(30) Foreign Application Priority Data

Nov. 22, 2022 (JP) ................................ 2022-186363

(51) Int. Cl.
*B41J 2/165* (2006.01)
*B41J 2/045* (2006.01)
(Continued)

(52) U.S. Cl.
CPC ....... *B41J 2/16511* (2013.01); *B41J 2/04553* (2013.01); *B41J 2/04566* (2013.01);
(Continued)

(58) Field of Classification Search
CPC ......................... B41J 2/16511; B41J 2/04553; B41J 2/04566; B41J 2/16544; B41J 2/16517; B41J 2/16552
See application file for complete search history.

(56) References Cited

U.S. PATENT DOCUMENTS 7,287,825 B2 10/2007 Furuichi et al. ......... B41J 2/165
7,290,858 B2 11/2007 Furuichi et al. ......... B41J 2/205
(Continued)

FOREIGN PATENT DOCUMENTS

JP 2005-103895 4/2005
JP 2006-181810 7/2006
JP 2016-074200 5/2016

OTHER PUBLICATIONS

U.S. Appl. No. 18/513,078, filed Nov. 17, 2023.
(Continued)

*Primary Examiner* — Sharon Polk
(74) *Attorney, Agent, or Firm* — Venable LLP

(57) ABSTRACT

A printing apparatus has a moving carriage mounted on a printing head having a liquid ejection nozzle, a first cap at one end of a carriage movement range to cap the nozzle, a second cap at the other end of the range, to cap the nozzle, and a control unit having a first control in which first cap caps the nozzle or a second control in which the second cap caps the nozzle. When the carriage has anomalously stopped during printing, a recovery operation on the printing head after the first control execution is different from a recovery operation on the printing head after the second control is executed. The recovery operation includes preliminary liquid ejection at a timing other than printing, suctioning the liquid inside the first cap when the nozzle is capped by the first cap, and/or dipping the nozzle into the liquid supplied into the first cap.

19 Claims, 14 Drawing Sheets

(51) Int. Cl.
*B41J 2/21* (2006.01)
*B41J 29/393* (2006.01)

(52) U.S. Cl.
CPC ......... *B41J 2/16544* (2013.01); *B41J 2/2103* (2013.01); *B41J 29/393* (2013.01)

(56) References Cited

U.S. PATENT DOCUMENTS

| | | | | |
|---|---|---|---|---|
| 8,882,232 | B2 | 11/2014 | Ibe et al. | B41J 29/393 |
| 9,114,651 | B2 | 8/2015 | Kato et al. | B41J 29/393 |
| 9,162,462 | B2 | 10/2015 | Komatsu et al. | B41J 2/165 |
| 9,561,658 | B2 | 2/2017 | Danzuka et al. | B41J 29/393 |
| 9,707,763 | B2 | 7/2017 | Nakagawa et al. | B41J 2/165 |
| 9,862,195 | B2 | 1/2018 | Genta et al. | B41J 2/165 |
| 10,369,797 | B2 | 8/2019 | Genta et al. | B41J 2/165 |
| 11,247,471 | B2 | 2/2022 | Narumi et al. | B41J 2/165 |
| 11,772,380 | B2 | 10/2023 | Narumi et al. | B41J 2/165 |
| 2003/0063177 | A1* | 4/2003 | Yoshimura | B41J 2/1652 347/108 |
| 2012/0007904 | A1* | 1/2012 | Anzai | B41J 11/006 347/9 |
| 2016/0052315 | A1* | 2/2016 | Aoyama | B41J 29/38 347/19 |
| 2018/0154639 | A1* | 6/2018 | Furukawa | B41J 2/16535 |
| 2020/0070499 | A1 | 3/2020 | Suzuki et al. | B41J 2/0451 |
| 2022/0305792 | A1 | 9/2022 | Ishii et al. | B41J 2/165 |
| 2022/0324233 | A1 | 10/2022 | Uetsuki et al. | B41J 2/165 |
| 2022/0388321 | A1 | 12/2022 | Takekoshi et al. | B41J 25/00 |
| 2024/0001678 | A1 | 1/2024 | Tomida et al. | B41J 2/165 |
| 2024/0010002 | A1 | 1/2024 | Takekoshi et al. | B41J 2/175 |

OTHER PUBLICATIONS

U.S. Appl. No. 18/535,252, filed Dec. 11, 2023.
U.S. Appl. No. 18/535,834, filed Dec. 11, 2023.
U.S. Appl. No. 18/399,572, filed Dec. 28, 2023.

* cited by examiner

| | | NON-OPERATED TIME | | | |
|---|---|---|---|---|---|
| | | LESS THAN 3 HOURS | LESS THAN 24 HOURS | LESS THAN 72 HOURS | 72 HOUR OR MORE |
| CARRIAGE POSITION | OVER PRINTING REGION | SECOND CLEANING | THIRD CLEANING | | |
| | OVER DRY CAP | FIRST CLEANING | | SECOND CLEANING | THIRD CLEANING |
| | OVER WET CAP | FIRST CLEANING | | | SECOND CLEANING |

FIG.7

| | | NON-OPERATED TIME | | | |
|---|---|---|---|---|---|
| | | LESS THAN 3 HOURS | LESS THAN 24 HOURS | LESS THAN 72 HOURS | LESS THAN 72 HOURS |
| CARRIAGE POSITION | OVER PRINTING REGION | FIRST CLEANING | SECOND CLEANING | THIRD CLEANING | |
| | OVER DRY CAP | FIRST CLEANING | | | SECOND CLEANING |
| | OVER WET CAP | FIRST CLEANING | | | |

FIG.13

PRINTING APPARATUS, METHOD FOR CONTROLLING PRINTING APPARATUS, AND STORAGE MEDIUM HAVING FIRST AND SECOND CAPS CAPPING A LIQUID EJECTION NOZZLE AND ASSOCIATED RECOVERY OPERATIONS

CROSS REFERENCE TO PRIORITY APPLICATION

This application claims the benefit of Japanese Patent Application No. 2022-186363, filed Nov. 22, 2022, which is hereby incorporated by reference herein in its entirety.

BACKGROUND OF THE DISCLOSURE

Field of the Disclosure

The present disclosure relates to a printing apparatus that ejects a liquid such as an ink to form an image.

Description of the Related Art

Inks used for printing apparatuses are thickened as moisture evaporates. Inks thickened in nozzles hinder ejection of ink droplets and cause disturbance of landing positions of ink droplets on a print medium, and the like. Hence, in order to suppress the thickening of inks, it is necessary to maintain the printing head in a wet state by capping the nozzle face, for example.

Japanese Patent Laid-Open No. 2016-074200 (hereafter, referred to as the '200 document) discloses a technique in which recovery, units each including both a cap unit and a wiper unit are disposed respectively on both side of a platen, and, in a case when contact between a printing head and a print medium is detected, a carriage is moved in a direction in which the carriage can be retracted, so that the printing head is maintained in a wet state.

However, in the technique of the '200 document, since a mechanism that maintains a wet state is disposed in the recovery units on both sides of the platen, the number of components increases. It is demanded to appropriately maintain a wet state while reducing the number of components for maintaining the wet state.

SUMMARY OF THE DISCLOSURE

A printing apparatus according to the present disclosure comprises a carriage configured to cause a printing head to scan, the printing head having a nozzle configured to eject a liquid, a first cap disposed at one end of a range in which the carriage moves and configured to cap the nozzle, a second cap disposed at the other end of the range in which the carriage moves and configured to cap the nozzle, and a control unit configured to be capable of executing a first control in which the nozzle is capped by the first cap and a second control in which the nozzle is capped by the second cap, in a case when the carriage has anomalously stopped during printing using the printing head.

Further features of the present disclosure will become apparent from the following description of exemplary embodiments with reference to the attached drawings.

BRIEF DESCRIPTION OF THE DRAWINGS

FIG. 7 is a table used to determine a recovery method at the time of return;

FIG. 13 is a table used to determine a recovery method at the time of return in a case where the circulation pump is being driven.

DESCRIPTION OF THE EMBODIMENTS

Figure 1A:
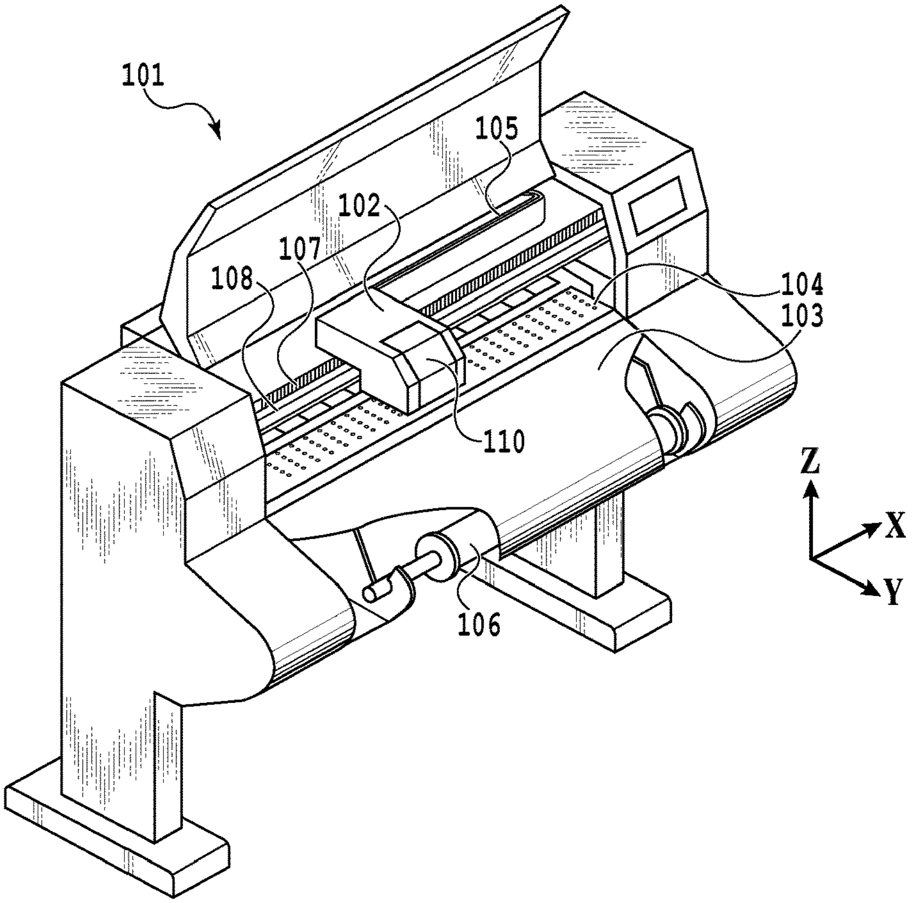
FIGS. 1A and 1B are schematic configuration diagrams of a printing apparatus.

Hereafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals. Further, each process (step) in the flowcharts and the sequence charts is denoted by a reference numeral starting with S.

Note that the term "printing" in the specification of the present application includes not only forming meaningful information such as text and figures but also forming meaningless information. In addition, the term also broadly includes forming images, designs, and patterns, and the like, on a print medium and processing a medium, whether or not they are visible so that humans can see them. Examples of "print media" include not only paper, which is used for common printing apparatuses, but also broadly include what is capable of receiving ink, such as cloth, plastic film, metal plates, glass, ceramics, wood, and leather. In addition, the "ink" (which may be also referred to as a "liquid") should be broadly interpreted in the same way as in the above definition of "printing". Hence, the "ink" means a liquid that is applied onto a print medium to form images, designs, patterns, and the like, or to process a print medium, or a liquid that can be provided for ink processing (for example, solidification, insolubilization, or the like, of colorants in ink that is applied to a print medium). Further, "nozzles" comprehensively mean ejection orifices for ejecting the ink, liquid paths communicating with the ejection orifices, and elements for generating energy used for ejecting the ink, unless otherwise noted.

First Embodiment

Hereafter, an inkjet printing apparatus according a first embodiment of the present disclosure will be described in detail with reference to the drawings.

<Serial Printing Head>

Figure 1B:
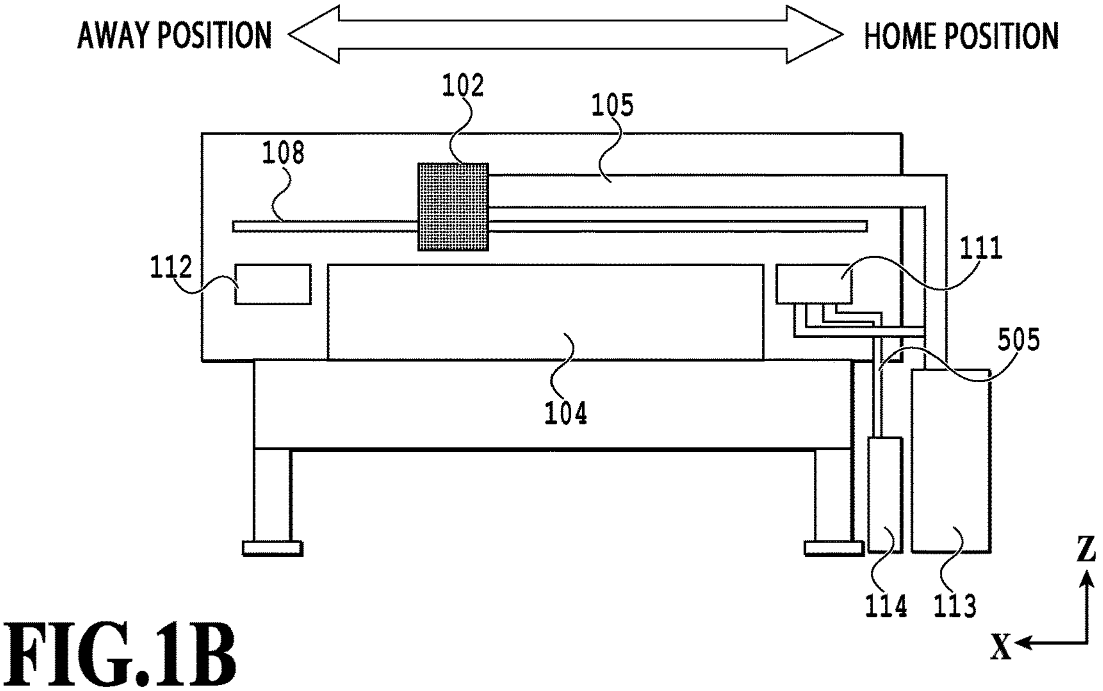

FIG. 1A is a schematic configuration diagram of an inkjet printing apparatus 101 according to the first embodiment (hereafter, referred to as a "printing apparatus"). FIG. 1B is a sectional view of the printing apparatus 101 according to the first embodiment in an XZ plane.

The printing apparatus 101 is a so-called serial scanning-type printer and prints an image by causing a printing head 110 to scan in an X direction (scanning direction) orthogonal to a Y direction (conveyance direction) of a print medium 103.

With reference to FIG. 1A and FIG. 1B, a configuration and an operation during printing of this printing apparatus 101 will be described. First, the print medium 103 is conveyed in the Y direction from a spool 106 that holds the print medium 103 by a conveyance roller that is driven by a conveyance motor 215 via gears.

On the other hand, at a predetermined conveyance position, a carriage unit 102 is caused to reciprocally scan (reciprocally move) above the print medium 103 along a guide shaft 108 that extends in the X direction by a carriage motor 216. On the carriage unit 102, the printing head 110 described later is mounted.

Then, in the process of this scanning, an ejection operation to eject an ink from nozzles of the printing head 110 is performed at a timing based on a position signal obtained by an encoder 107, to perform printing in a certain bandwidth corresponding to a range of array of the nozzles. Thereafter, the print medium 103 is conveyed, and further printing is performed in the next bandwidth.

The fed print medium 103 is pinched and conveyed by a feed roller and a pinch roller, and is guided to a printing position (a scanning region of the printing head) on a platen 104. Normally, in a dormant state in which the printing is not performed by the printing head 110, the printing head 110 is capped by a cap 501 disposed in a first recovery unit 111 or a cap 508 disposed in a second recovery unit 112, which is described later, in the state of being tightly fitted on an orifice face of the printing head 110. In a case of starting a printing operation, the cap 501 or the cap 508 is released, and the carriage unit 102 including the printing head 110 is capable of scanning. Thereafter, once data for one scan is accumulated in a buffer, the carriage unit 102 is caused to scan by the carriage motor 216 to perform printing as mentioned above.

Note that a carriage belt (not shown) can be used for transmitting drive force from the carriage motor 216 to the carriage unit 102. Instead of a carriage belt, another drive system can also be used such as a mechanism including a lead screw that extends in the X direction and is driven to rotate by the carriage motor 216, and an engagement portion that is provided in the carriage unit 102 and engages with a groove of the lead screw, for example.

In addition, the ink to be supplied to the printing head 110 is supplied from an ink tank (not shown) mounted on a built-in or an external ink tank unit 113 via the carriage unit 102 by using a supply tube 105. The ink may be supplied from the ink tank to the printing head 110 by using a pressurization unit. Alternatively, the ink may be supplied by capping a nozzle face of the printing head 110 by using the cap 501 of the first recovery unit 111 and applying negative pressure into the cap 501 by using a suction pump to suction the ink.

In addition, the plural printing heads 110 capable of ejecting an ink of one color or inks of plural colors may be mounted on the carriage unit 102, or one printing head capable of ejecting inks of plural of colors may be mounted on the carriage unit 102.

<Print Control>

Figure 2:
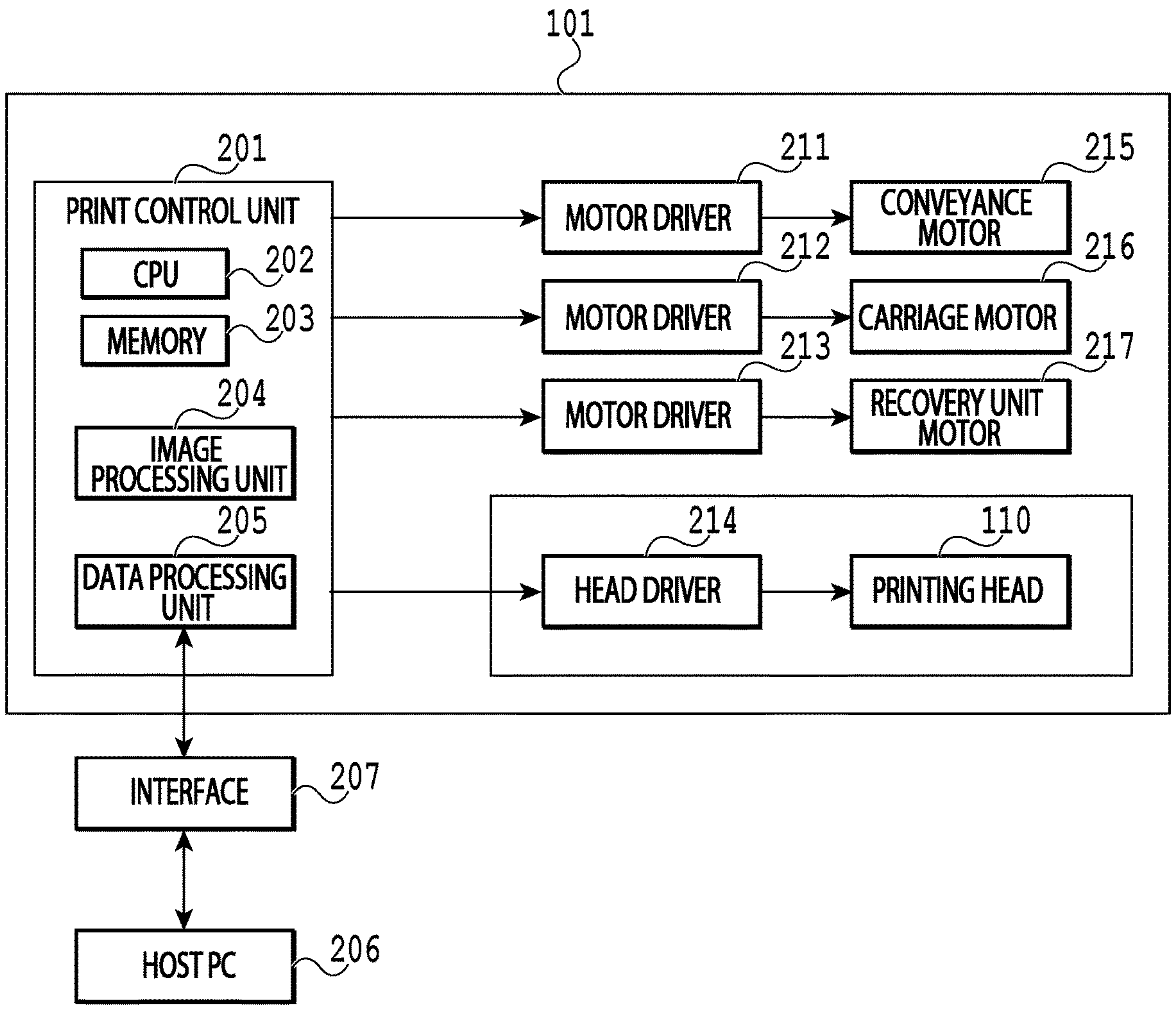
FIG. 2 is a hardware configuration diagram of a control system of the printing apparatus.

FIG. 2 is a block diagram showing a configuration of a print control system in the printing apparatus 101 shown in FIGS. 1A and 1B.

The printing apparatus 101 includes a print control unit 201. The print control unit 201 includes a CPU 202, a memory 203, an image processing unit 204, and a data processing unit 205. Moreover, the print control unit 201 is connected to motor drivers 211, 212, and 213, a head driver 214, and an interface 207.

The motor drivers 211, 212, and 213 are connected to a conveyance motor 215, a carriage motor 216, and a recovery unit motor 217, respectively. The head driver 214 is connected to the printing head 110. The interface 207 is connected to a data processing unit 205 and a host computer 206 (hereafter, referred to as a host PC).

The CPU 202 is a central processing unit which performs various controls on the printing apparatus 101. The CPU 202 may be ASIC.

The memory 203 stores input image data, multilevel gradation data of an intermediate product, and a multipath mask.

The image processing unit 204 and the data processing unit 205 perform predetermined image processing and predetermined data processing on image data, control data, and the like, received from the host PC 206 via the interface 207.

The motor drivers 211, 212, and 213 are drivers that drive and rotate the conveyance motor 215, the carriage motor 216, and the recovery unit motor 217, respectively.

The head driver 214 is a driver that drives the printing head 110, and in a case where a plurality of printing heads are mounted, a plurality of the head drivers 214 are provided corresponding to the number of the printing heads.

The conveyance motor 215 is a motor that drives and rotates the conveyance roller for conveying the print medium 103.

The carriage motor 216 is a motor that reciprocally drives the carriage unit 102 on which the printing head 110 is mounted.

Figure 5A:
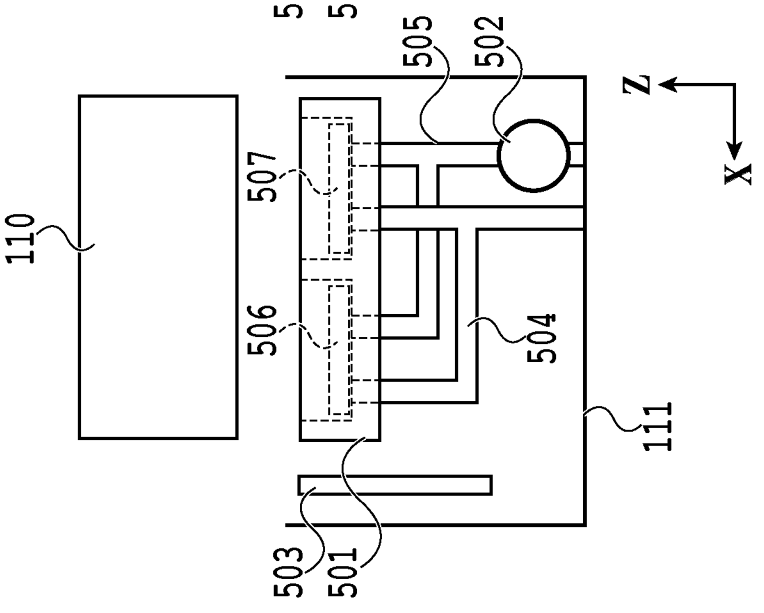
FIGS. 5A to 5C are schematic diagrams of a first recovery unit and a second recovery unit.
Figure 5B:
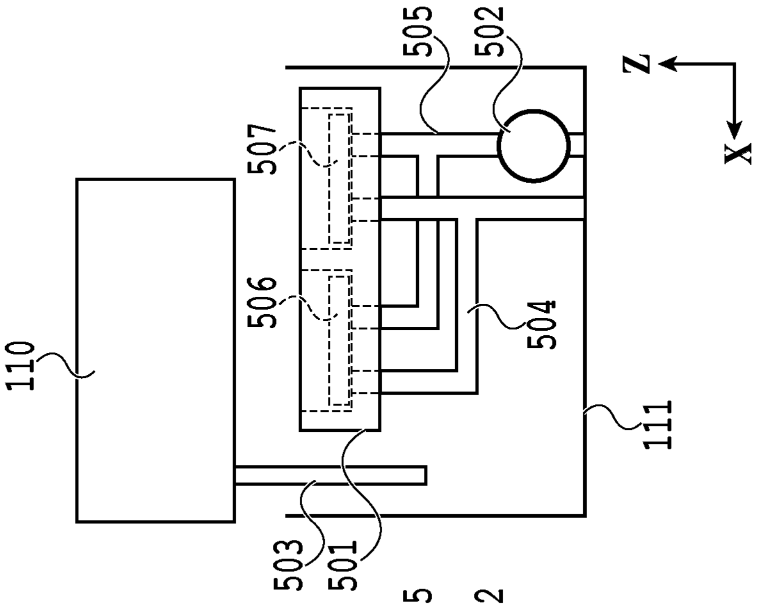
Figure 5C:
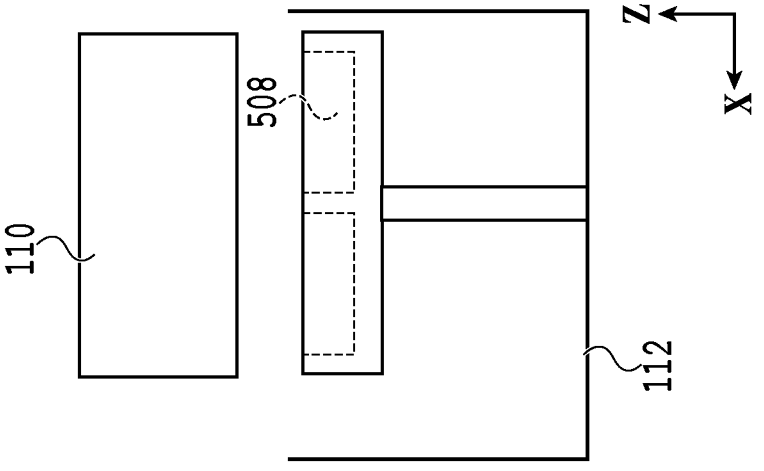

The recovery unit motor 217 is a motor that is mounted on the first recovery unit 111, and switches a driving unit using by a cam shaft to operate a wiper 503 or a suction pump 502 (see FIGS. 5A to 5C).

<Configuration of Printing Head>

Figure 3A:
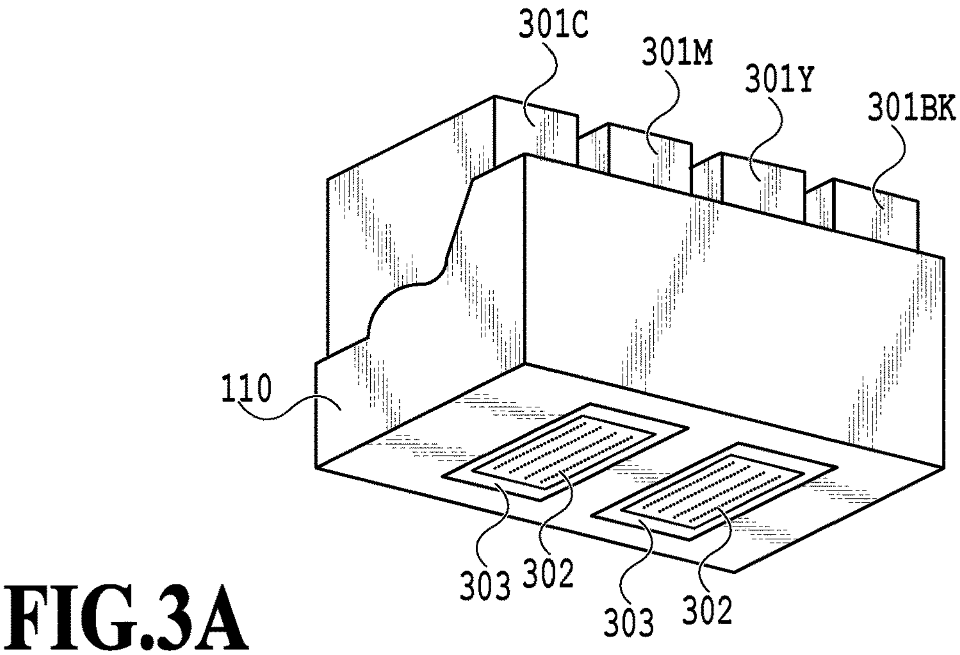
FIGS. 3A and 3B are schematic diagrams of a printing head.

FIG. 3A is a perspective view showing an example of a configuration of the printing head 110 and the nozzle array.

The printing head 110 in the present embodiment includes buffer tanks 301C, 301M, 301Y, and 301BK, which are independent from one another, for inks of four colors, cyan, magenta, yellow, and black. Although FIG. 3A shows the buffer tanks such that the buffer tanks are visually recognizable for description, the buffer tanks are housed inside the printing head.

In a lower face of the printing head 110, chips 303 in which the nozzle arrays corresponding to the respective inks are formed are disposed. In each chip 303, two arrays of 1024 nozzles 302 are formed at an interval of 1200 dpi for one color, and it is possible to eject two colors with one chip. Disposing two chips as above makes it possible to perform printing with four colors. The nozzle array of one color does not need to be disposed on the same single line, and a configuration in which the nozzle arrays are disposed in a staggered manner, and the four nozzle arrays with 512 nozzles are disposed at an interval of 600 dpi may be employed.

Figure 3B:
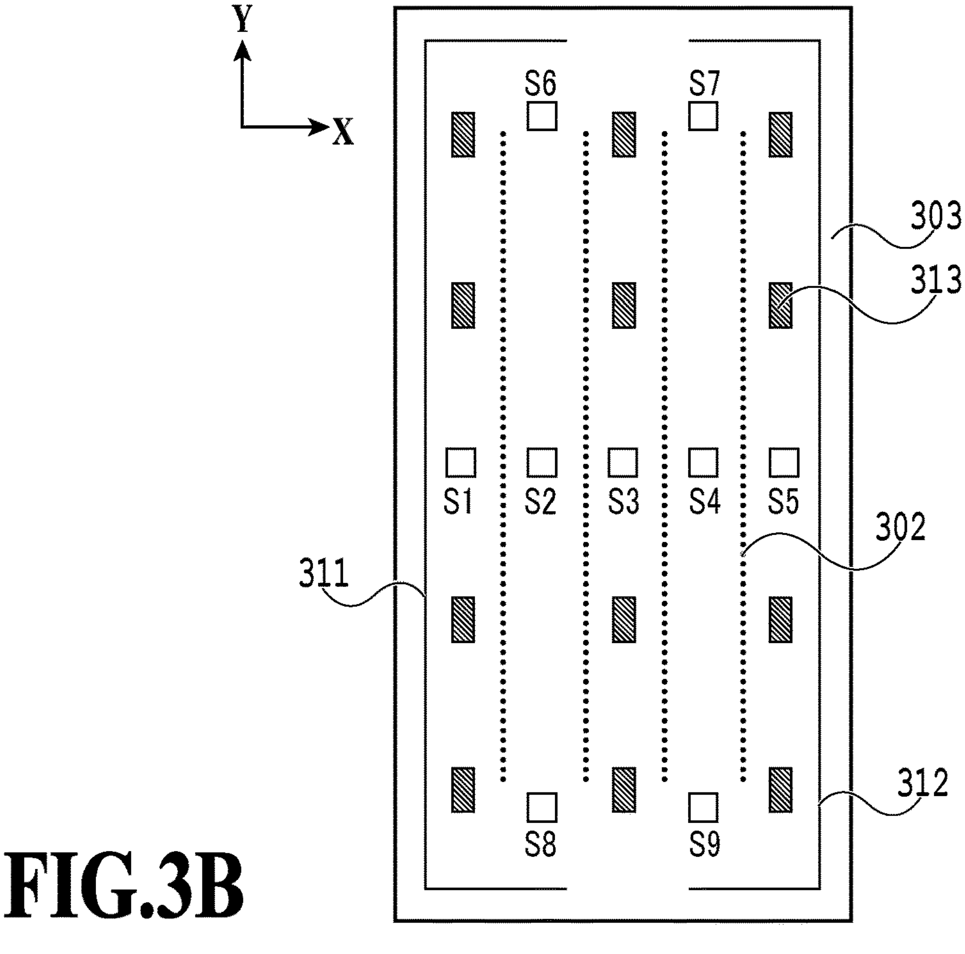

FIG. 3B is a plan view showing a detailed configuration of the chip 303.

Temperature sensors S6, S7, S8, and S9, which are diodes for detecting the temperature of the chip 303, are disposed at end portions in the nozzle array direction 302 on the chip 303.

The temperature sensors S6, S7, S8, and S9 are at positions about 0.2 mm away from the positions of the outermost nozzles of the nozzle arrays in the array direction (Y direction) of the nozzles, and are disposed at an intermediate position between two nozzle arrays in the main scanning direction (X direction).

In a center portion in the nozzle array direction, temperature sensors S1, S2, S3, S4, and S5, which are diodes for detecting temperatures of the center portion of the nozzle array, are formed. Each of the temperature sensors S1, S2, S3, S4, and S5, disposed in an intermediate position, is sandwiched by two nozzle arrays. Warming heaters 311 and 312 are formed in such a manner so as to surround the nozzle arrays, and are positioned 1.2 mm outward from the outermost nozzle array in the main scanning direction and 0.2 mm outward from the temperature sensors S6, S7, S8, and S9 in the nozzle array direction. In the chip 303, a lateral dimension and a longitudinal dimension are 9.55 mm and 39.0 mm, respectively.

In addition, a plurality of heating elements 313 capable of heating the chip 303 are disposed on the chip 303. This makes it possible to perform a temperature adjustment control to heat the ink to a certain temperature without being affected by the environmental temperature and to suppress a change in viscosity of the inks inside the printing head 110. Thus, the viscosity of the inks is maintained to be constant.

In the printing head 110, drivers (drive units), which are not shown, are disposed, and the drivers are connected to the respective heating elements 313, and are capable of controlling ON or OFF of the drive currents of the heating elements 313.

Figure 4:
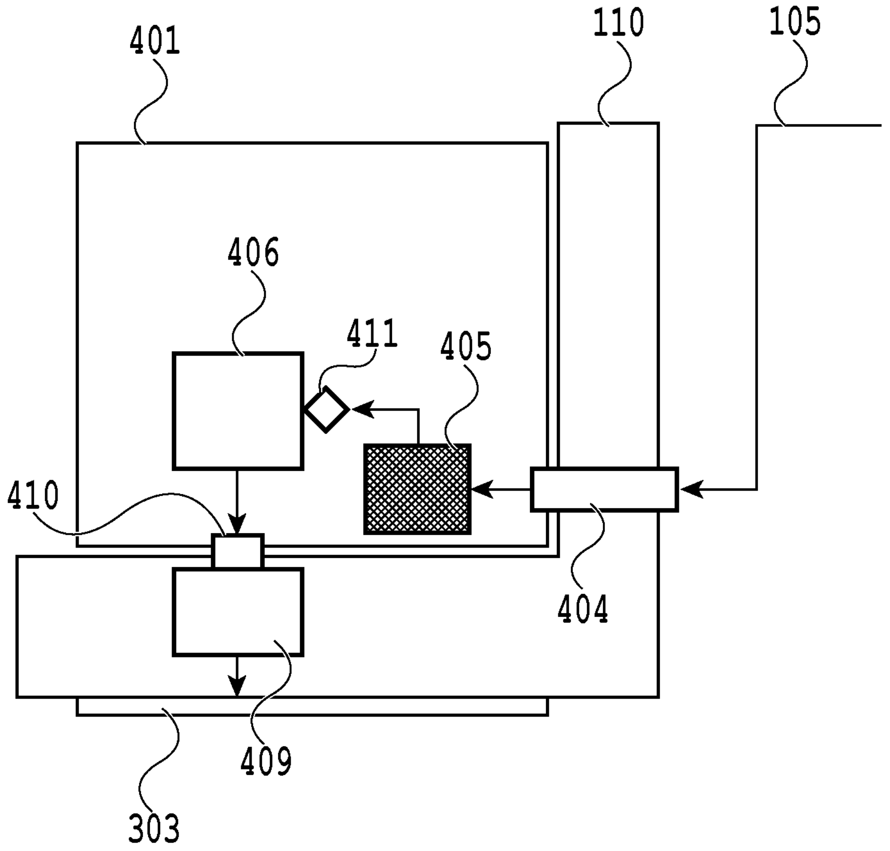
FIG. 4 is a schematic diagram showing a configuration of the printing head and a buffer tank.

FIG. 4 is a schematic diagram showing a configuration of the printing head 110 and the buffer tank 401. Although the schematic diagram shows a flow path for one color here, it is assumed that buffer tanks and flow paths for four colors, cyan, magenta, yellow, and black, are included in one printing head 110.

The supply tube 105 is connected to a joint 404 of the printing head 110 through the inside of the carriage unit 102 and communicates with the buffer tank 401. The ink supplied from the ink tank passes through inside the flow path of the filter 405 and the buffer tank 401, and reaches the first pressure chamber 406.

An inlet port of the first pressure chamber 406 is provided with a valve 411 that opens in a case when a predetermined negative pressure is reached. The valve 411 is provided in a flow path between the filter 405 and the first pressure chamber 406.

In the chip 303, the ink is supplied from the first pressure chamber 406 to supply paths of one or a plurality of nozzle arrays disposed in the chip 303 via the joint 410 and a common supply path 409 included in the printing head 110. The detail of the supply paths will be described later.

<Recovery Unit>

Next, a configuration of a recovery unit that recovers the ejection state of the printing head 110 in the present embodiment will be described in detail. In the present disclosure, the recovery units are disposed at two positions, and the wet states in cap mechanisms included in the respective recovery units are different.

In the present embodiment, configurations of two types of the first recovery unit 111 including the wet cap and the second recovery unit 112, including the dry cap, will be described.

FIG. 5A is a schematic diagram of the first recovery unit 111 according to the present embodiment.

The first recovery unit 111 includes the cap 501 and a maintaining mechanism that maintains the wet state in the cap 501. The maintaining mechanism includes the suction pump 502 (negative pressure generating unit), a cleaning liquid tank (not shown) (supply unit), and a cleaning unit that cleans the nozzle face of the printing head 110 by using the wiper 503 (wiping member).

Here, the cap 501 is a member that covers the nozzle face of the printing head 110. The suction pump 502 suctions the ink from the printing head 110 by generating negative pressure inside the printing head 110 in a state where the cap 501 covers the nozzle face. The wiper 503 wipes the nozzle face of the printing head 110. The cleaning liquid tank supplies a cleaning liquid into the cap 501. As the cleaning liquid, for example, water or a liquid using glycerin as a solvent is used.

The first recovery unit 111 is disposed at a position facing the printing head 110 in a case when the carriage unit 102 has stopped at a home position. The home position in the present embodiment means a position at one end that is the right end in the main scanning direction of the carriage unit 102 as shown in FIG. 1B. This is only an example, and the home position may be set to a position at the other end that is the left end in the main scanning direction of the carriage unit 102.

The cap 501 is supported by a raise/lower mechanism (not shown) to be capable of being raised and lowered, and moves between a raised position and a lowered position. At the raised position, the cap 501 abuts on the printing head 110 to cap the nozzle face of the printing head 110.

The cap 501 suppresses the drying of the nozzles of the printing head 110 and evaporation of the ink at the time of non-printing operation by covering the nozzle face of the printing head 110. In addition, in a state where the nozzle face of the printing head 110 is capped by the cap 501, it is possible to suction the ink from the printing head 110 by driving the suction pump 502, which will be described later.

Tubes 504 and 505 are connected to the cap 501. The tube 504 is connected to the cleaning liquid tank (not shown) mounted on the built-in or external ink tank unit 113 for cleaning the cap 501 and the printing head 110. The cleaning liquid is supplied into the cap 501 via the tube 504 by the pressurization unit for the purpose of diluting the residual ink in the cap 501 to prevent the ink from being solidified. Although the cleaning liquid is mainly supplied after a preliminary ejection of ejecting the ink from the printing head 110 for the purpose of recovery or a suction operation of the nozzles by the suction pump 502, a configuration in which the cleaning liquid is supplied at every certain period for maintaining the wet state may be employed.

The tube 505 is connected to a waste liquid tank 114 into which the ink or the cleaning liquid held in the cap 501 (in the cap into which the cleaning liquid has been supplied) can be discharged by using the suction pump 502. In addition, since absorbers 506 and 507 are disposed in the cap 501, the cap 501 is capable of holding certain amounts of the ink discharged in the preliminary ejection and the suction operation as well as the cleaning liquid supplied from the cleaning liquid tank.

In addition, at the time of printing operation, the cap 501 is located at the lowered position in order to avoid interference with the printing head 110 that moves together with the carriage unit 102. In the state where the cap 501 is located at the lowered position, the printing head 110 can perform the preliminary ejection on the cap 501 in a case when the printing head 110 has been moved to a position facing the cap 501.

The wiper 503 (wiper blade) is configured from an elastic member such as rubber.

In the present embodiment, the wiper 503 reciprocates between a wiping position and a retracted position in an arrow Z direction by a known method in order to remove foreign matters such as an ink residue adhering to the nozzle face.

In addition, at the time of non-wiping, the wiper 503 is located at the retracted position as shown in FIG. 5A. On the other hand, at the time of wiping operation, the wiper 503 moves to the wiping position as shown in FIG. 5B, and, in this state, the carriage unit 102 moves in the arrow X direction, so that the wiper abuts on the nozzle face to perform the wiping operation.

In the present embodiment, although the wiper 503 is configured from the elastic member such as the rubber, the wiper 503 may be a member configured from a porous material that absorbs the ink. In addition, the wiper 503 may have a vacuum wiper configuration that suctions the nozzle face.

In the configuration of the present embodiment, the wiping operation is performed only in a case when the wiper 503 moves in one direction. A configuration in which the wiping operation is performed in a case when the wiper 503 moves in both directions may be employed.

In the present embodiment, the wiping direction is a direction normal to the nozzle arrangement direction in the printing head 110. A configuration in which the wiper moves in the arrangement direction of the nozzle arrays may be employed.

The suction pump 502 performs a suction operation in which the suction pump 502 is driven in a state where the cap 501 has covered the nozzle face of the printing head 110 and the capped area is substantially a closed space. A negative pressure is generated inside of the capped area, resulting in suctioning the ink from the printing head 110. That is, the suction pump 502 acts as a negative pressure generating unit. This suction operation is performed in a case of filling the printing head 110 with the ink from the ink tank (at the time of initial filling) and in a case of suctioning and removing dusts, solidified matters, bubbles, and the like, inside the nozzle 302 (at the time of suction recovery).

In the present embodiment, a tube pump is used as the suction pump 502. The tube pump includes: a holding unit which holds a tube 505 (at least a part of a tube 505) and has a curved surface portion which is formed along the tube 505 (at least a part of the tube 505), a roller capable of pressing the held tube 505, and a roller supporting unit rotatably supporting the roller. The tube pump rotates the roller while pressing down the tube 505 by rotating the roller supporting unit in a predetermined direction. In this way, the tube pump generates a negative pressure inside the cap 501 to suction the ink from the printing head 110. The suctioned ink is discharged to a waste ink absorber or a waste ink recovery bottle through the tube 505.

In addition, in a case when a preliminary ejection is performed on the cap 501 by the printing head 110, the suction operation is also performed, resulting in discharging the ink received in the cap 501 by the preliminary ejection. That is, it is possible to discharge the ink held inside the cap 501 to the waste liquid tank 114 via the tube 505 by driving the suction pump 502 in a case where the amount of the ink held in the cap 501 has reached a predetermined amount by the preliminary ejection.

Further, the suction operation is also performed in a case of discharging the cleaning liquid supplied from the cleaning liquid tank via the tube 504. It is possible to discharge the cleaning liquid held in the cap 501 to the waste liquid tank 114 via the tube 505 by driving the suction pump 502 in a case when the amount of the cleaning liquid held in the cap 501 has reached a predetermined amount.

Subsequently, the second recovery unit 112 will be described. The second recovery unit 112 includes only the cap 508 that covers the nozzle face of the printing head 110. The second recovery unit 112 is disposed at a position facing the printing head 110 in a case when the carriage unit 102 has stopped at an away position. The away position in the present embodiment means a position at the other end that is the left end in the main scanning direction of the carriage unit 102 as shown in FIG. 1B. This is only an example, and the away position may be set to a position at the one end that is the right end in the main scanning direction of the carriage unit 102.

FIG. 5C is a schematic diagram of the second recovery unit 112 according to the present embodiment.

The cap 508 is supported by a raise/lower mechanism (not shown) to be capable of being raised and lowered, and moves between the raised position and the lowered position. At the raised position, the cap 508 abuts on the printing head 110 to cover (cap) the nozzle face of the printing head 110. The cap 508 suppresses the drying of the nozzles of the printing head 110 and evaporation of the ink at the time of non-printing operation by covering the nozzle face of the printing head 110. On the other hand, since the cap 508 does not have a suction pump and a cleaning liquid supply path, the preliminary ejection or the suction operation of the printing head 110 is not performed in the cap 508.

Since a liquid cannot be held in the cap 508 of the second recovery unit 112, the cap 508 of the second recovery unit 112 is drier than the cap 501 of the first recovery unit 111.

In addition, the positions of the first recovery unit 111 and the second recovery unit 112 disposed are not limited to the above-described positions. A configuration in which the first recovery unit 111 is disposed at the away position and the second recovery unit 112 is disposed at the home position may be employed. It is desirable that two recovery units are disposed to sandwich a conveyance path of the print medium 103. Moreover, three or more recovery units, that is, three or more caps may be disposed.

<Composition of Ink>

Next, the inks used in the present embodiment will be described. In the following, "parts" and "%" are based on mass unless otherwise noted.

(Black Ink)

(1) Preparation of Pigment Dispersion Liquid

First, an anionic macromolecule P-1 (styrene/butyl acrylate/acrylic acid copolymer (polymerization ratio (weight ratio)=30/40/30), acid value=202, weight average molecular weight=6500) is prepared. This is neutralized with a potassium hydroxide aqueous solution and diluted with ion-exchanged water to prepare a homogeneous 10-mass % polymer aqueous solution.

100 g of the above polymer aqueous solution, 100 g of carbon black, and 300 g of ion-exchanged water are blended and mechanically agitated for 0.5 hour. Then, using a micro-fluidizer, this mixture is processed by passing it through an interaction chamber five times under a liquid pressure of approximately 70 MPa. Further, the dispersion liquid obtained in the above is subjected to a centrifugation process (12,000 rpm, 20 minutes) to remove non-dispersive substances including coarse particles, so that a black dispersion liquid is obtained. The black dispersion liquid obtained has a pigment concentration of 10 mass %, and a dispersant concentration of 6 mass %.

(2) Preparation of Fine Resin Particle Dispersion Liquid

First, under a nitrogen atmosphere, the following three additive liquids heated to 70° C. are added to each other by dripping them little by little while agitating them by using a motor, and polymerized for five hours. The additive liquids are a hydrophobic monomer having 28.5 parts of methyl methacrylate, a mixture liquid containing a hydrophilic monomer having 4.3 parts of sodium p-styrenesulfonate and 30 parts of water, and a mixture liquid containing a polymerization initiator having 0.05 part of potassium persulfate and 30 parts of water.

(3) Preparation of Ink

An ink is prepared by using the above black dispersion liquid and the above fine resin particle dispersion liquid. The following components are added to these at a predetermined concentration, and these components are sufficiently blended and agitated and then filtered under pressure through a micro-filter with a pore size of 2.5 μm (manufactured by FUJIFILM Corporation) to prepare a pigment ink having a pigment concentration of 5 mass % and a dispersant concentration of 3 mass %.

| | |
|---|---|
| The above black dispersion liquid | 50 parts |
| The above fine resin particle dispersion liquid | 10 parts |
| 2-methyl 1,3 propanediol | 15 parts |
| 2-pyrrolidone | 5 parts |
| Acetylene glycol EO adduct | 0.5 parts |
| Ion-exchanged water (manufactured by Kawaken Fine Chemicals Co., Ltd.) | Balance |

(Cyan Ink)

(1) Preparation of Dispersion Liquid

First, using benzyl acrylate and methacrylic acid as raw materials, an AB block polymer having an acid value of 250 and a number average molecular weight of 3000 is produced in a usual or customary manner, and further is neutralized with a potassium hydroxide aqueous solution and diluted with ion-exchanged water to prepare a homogeneous 50-mass % polymer aqueous solution.

Here, 180 g of the above polymer solution, 100 g of C.I. Pigment Blue 15:3, and 220 g of ion-exchanged water are blended and mechanically agitated for 0.5 hour.

Then, using a micro-fluidizer, this mixture is processed by passing it through an interaction chamber five times under a liquid pressure of approximately 70 MPa.

Further, the dispersion liquid obtained in the above is subjected to a centrifugation process (12,000 rpm, 20 minutes) to remove non-dispersive substances including coarse particles, so that a cyan dispersion liquid is obtained. The cyan dispersion liquid obtained has a pigment concentration of 10 mass %, and a dispersant concentration of 10 mass %.

(2) Preparation of Fine Resin Particle Dispersion Liquid

A fine resin particle dispersion liquid is prepared using materials and a preparation method similar to those described for the black ink.

(3) Preparation of Ink

An ink is prepared by using the above cyan dispersion liquid. The following components are added to these at a predetermined concentration. Further, these components are sufficiently blended and agitated and then filtered under pressure through a micro-filter with a pore size of 2.5 μm (manufactured by FUJIFILM Corporation) to prepare a pigment ink having a pigment concentration of 2 mass % and a dispersant concentration of 2 mass %.

| | |
|---|---|
| The above cyan dispersion liquid | 20 parts |
| The above fine resin particle dispersion liquid | 10 parts |
| 2-methyl 1,3 propanediol | 15 parts |
| 2-pyrrolidone | 5 parts |
| Acetylene glycol EO adduct | 0.5 parts |
| Ion-exchanged water (manufactured by Kawaken Fine Chemicals Co., Ltd.) | Balance. |

(Magenta Ink)

(1) Preparation of Dispersion Liquid

First, using benzyl acrylate and methacrylic acid as raw materials, an AB block polymer having an acid value of 300 and a number average molecular weight of 2500 is produced in a usual or customary manner, and further is neutralized with a potassium hydroxide aqueous solution and diluted with ion-exchanged water to prepare a homogeneous 50 mass % polymer aqueous solution.

Here, 100 g of the above polymer solution, 100 g of C.I. Pigment Red 122, and 300 g of ion-exchanged water are blended and mechanically agitated for 0.5 hour.

Then, using a micro-fluidizer, this mixture is processed by passing it through an interaction chamber five times under a liquid pressure of approximately 70 MPa.

Further, the dispersion liquid obtained in the above is subjected to a centrifugation process (12,000 rpm, 20 minutes) to remove non-dispersive substances including coarse particles, so that a magenta dispersion liquid is obtained. The magenta dispersion liquid obtained has a pigment concentration of 10 mass %, and a dispersant concentration of 5 mass %.

(2) Preparation of Fine Resin Particle Dispersion Liquid

A fine resin particle dispersion liquid is prepared using materials and a preparation method similar to those described for the black ink.

(3) Preparation of Ink

An ink is prepared by using the above magenta dispersion liquid. The following components are added to these at a predetermined concentration. Further, these components are sufficiently blended and agitated and then filtered under pressure through a micro-filter with a pore size of 2.5 μm (manufactured by FUJIFILM Corporation) to prepare a pigment ink having a pigment concentration of 4 mass % and a dispersant concentration of 2 mass %.

| | |
|---|---|
| The above magenta dispersion liquid | 40 parts |
| The above fine resin particle dispersion liquid | 10 parts |
| 2-methyl 1,3 propanediol | 15 parts |
| 2-pyrrolidone | 5 parts |
| Acetylene glycol EO adduct | 0.5 parts |
| Ion-exchanged water (manufactured by Kawaken Fine Chemicals Co., Ltd.) | Balance |

(Yellow Ink)

(1) Preparation of Dispersion Liquid

First, the above anionic macromolecule P-1 is neutralized with a potassium hydroxide aqueous solution and diluted with ion-exchanged water to prepare a homogeneous 10 mass % polymer aqueous solution.

Here, 30 parts of the above polymer solution, 10 parts of C.I. Pigment Yellow 74, and 60 parts of ion-exchanged water are blended and introduced into a batch-type vertical sand mill (manufactured by IMEX Co., Ltd.), 150 parts of zirconia beads having a diameter of 0.3 mm are introduced, and the mixture is subjected to a dispersion process for 12 hours while being water-cooled.

Further, the dispersion liquid obtained in the above is subjected to a centrifugation process to remove non-dispersive substances including coarse particles, so that a yellow dispersion liquid is obtained. Approximately 12.5% of the yellow dispersion liquid obtained is solid contents, and the weight average particle size is 120 nm.

(2) Preparation of Fine Resin Particle Dispersion Liquid

A fine resin particle dispersion liquid is prepared using materials and a preparation method similar to those described for the black ink.

(3) Preparation of Ink

The following components are blended and sufficiently agitated to be dissolved and dispersed, and then filtered under pressure through a micro-filter with a pore size of 1.0 μm (manufactured by FUJIFILM Corporation) to prepare the ink.

| | |
|---|---|
| The above yellow dispersion liquid | 40 parts |
| The above fine resin particle dispersion liquid | 10 parts |
| 2-methyl 1,3 propanediol | 15 parts |
| 2-pyrrolidone | 5 parts |
| Acetylene glycol EO adduct | 0.5 parts |
| Ion-exchanged water (manufactured by Kawaken Fine Chemicals Co., Ltd.) | Balance |

The inks used in the present embodiment are characterized in that they contain "fine resin particles" in order to be fixed onto a non-permeable print medium. "Fine resin particles" mean fine particles made of a resin and having such a particle size as to be dispersible in an aqueous medium. The fine resin particles have a function of fixing the pigment onto a surface of a print medium by being heated to be melted and form a film (film formation) on the surface of the print medium.

In the present disclosure, a glass transition point Tg of the resin making up the fine resin particles is preferably higher than 30° C. and lower than 80° C. In a case when the glass transition point Tg of the resin is 30° C. or lower, the difference between the glass transition point Tg and room temperature will be small and the fine resin particles will be in a nearly melted state within the ink. This raises the viscosity of the ink inside the printing head and may lower image appearance quality (such as coloration and sharpness) due to defective ink ejection. In a case when the glass transition point Tg of the resin is 80° C. or higher, a large amount of heat will be needed at the heating unit to melt the fine resin particles. This may lead to a failure to melt the fine resin particles before the pigment agglutinates with evaporation of the water in the ink, and lower image appearance quality (such as coloration).

The resin making up the fine resin particles is not particularly limited as long as its glass transition point Tg is within the above range. Specifically, examples include an acrylic resin, a styrene-acrylic resin, a polyethylene resin, a polypropylene resin, a polyurethane resin, a styrene-butadiene resin, a fluoroolefin-based resin, and so on. For example, the acrylic resin can be obtained by combining monomers of a (meth)acrylic acid alkyl ester, a (meth)acrylic acid alkyl amide, or the like via emulsion polymerization or the like. In addition, the styrene-acrylic resin can be obtained by combining monomers of a (meth)acrylic acid alkyl ester, a (meth)acrylic acid alkyl amide, or the like, and styrene via emulsion polymerization or the like. By the emulsion polymerization, an emulsion with fine particles of the above resin (fine resin particles) dispersed in a medium can be obtained.

In the present disclosure, fine resin particles made of any generally used resin component that is insoluble in water can also be used as fine resin particles having a sulfonic acid group.

The resin component making up the fine resin particles is not particularly limited as long as it is a resin containing a sulfonic acid group, and any resin component such as any natural or synthetic macromolecule generally used or a macromolecule newly developed for this embodiment can be used without a limitation. In particular, a polymer or a copolymer of monomer components with a radically polymerizable unsaturated bond, by which acrylic resins and styrene/acrylic resins are classified, can be used in view of availability for general use and convenience in designing the functionality of the fine resin particles.

Generally, a surfactant is used as a penetrant to improve the permeability of ink into a print medium dedicated for inkjet printing. In the case of a non-permeable print medium, it is used to improve the wettability. The greater the amount of the surfactant added, the stronger a property of lowering the surface tension of the ink, and the more the wettability and permeability of the ink on and into a print medium are improved. As the surfactant, it is preferable to use an acetylene glycol EO adduct or a fluorine- or silicone-based surfactant. The fluorine-based or silicone-based surfactant, even if its content is low, can lower the surface tension of the ink and therefore enhance the wettability of the ink on a print medium. Thus, even in a case of performing printing on a non-water absorbing print medium, repelling of the ink on the surface of the print medium is suppressed. Accordingly, image quality can be improved further. In the present embodiment, the surface tension of each ink is uniformly set at 30 dyn/cm or lower as a preferred surface tension. The surface tension is measured using a fully-automatic surface tensiometer CBVP-Z (manufactured by Kyowa Interface Science Co., Ltd.). Note that the measurement apparatus is not limited to the one exemplarily mentioned above as long as the surface tension of each ink can be measured.

Meanwhile, each ink in this embodiment uses an anionic color material, so that the pH of the ink is stable on the alkali side and the value is 8.5 to 9.5. Generally, the pH of the ink is preferably 7.0 or greater and 10.0 or less in view of preventing elution of impurities from members that contact the ink, deterioration of the materials making up the members, lowering of the solubility of the pigment dispersion resin in the ink, and so on. The pH is measured using a pH meter F-52 manufactured by HORIBA, Ltd. Note that the measurement apparatus is not limited to the one exemplarily mentioned above as long as the pH of each ink can be measured.

<Recovery Flow>

Subsequently, in a case when an anomaly such as a jam of a print medium has occurred while the carriage unit 102 is moving, and the carriage unit 102 anomalously stops, a method for selecting a capping position of the carriage unit 102, and selecting a recovery operation (recovery method) based on a carriage position and an elapsed time at the time of the next recovery will be described.

Figure 6:
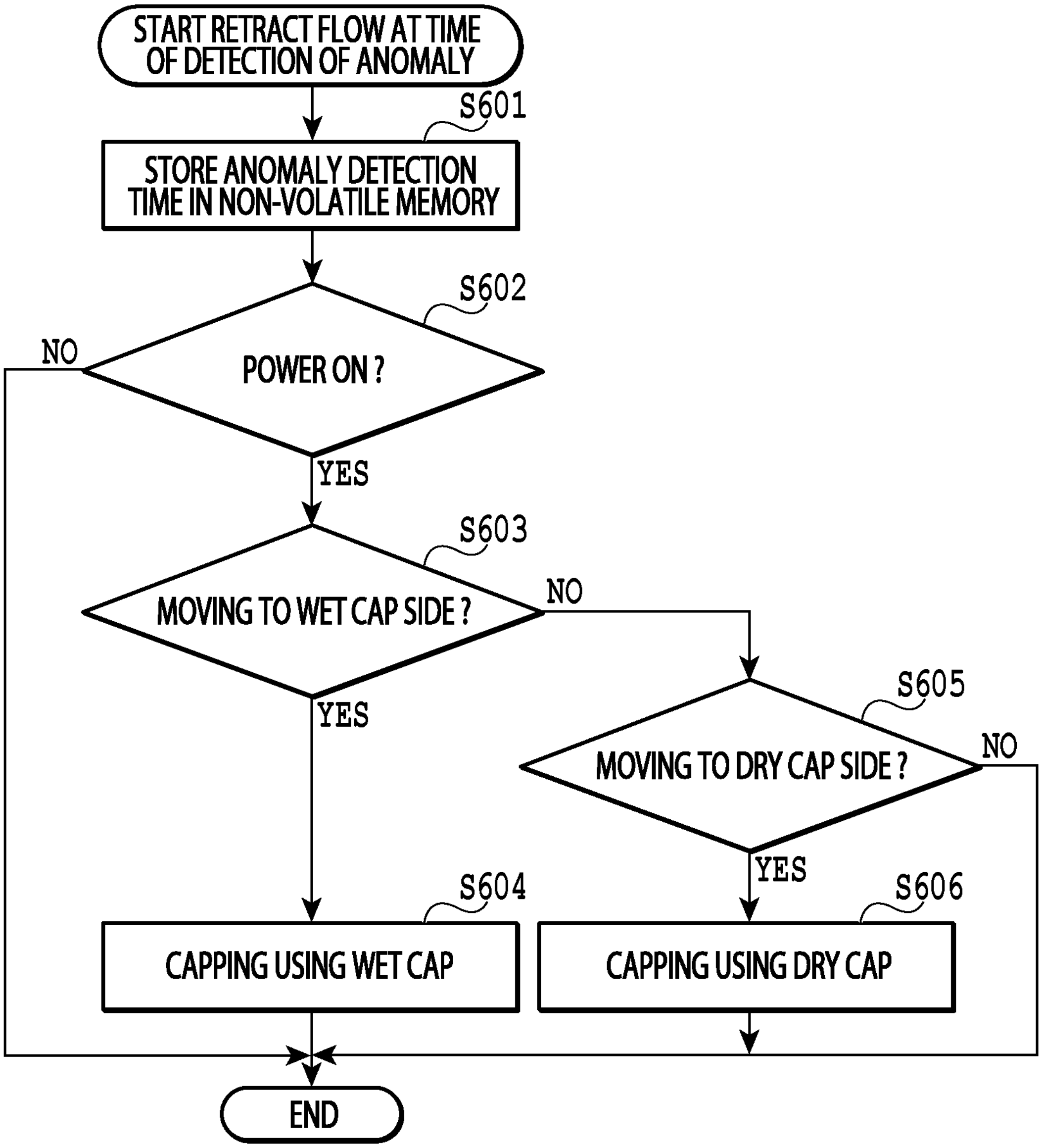
FIG. 6 is a flowchart showing a control flow of retract of a carriage.

FIG. 6 is a flowchart showing a retract flow of the carriage unit 102 in a case when the anomaly has been detected.

In S601, after the anomaly is detected, the CPU 202 stores an anomaly detection time in a non-volatile memory. The anomaly detection time is referred to in a case of calculating an elapsed time from the time of the anomaly detection at the time of return. After the CPU 202 stores the anomaly detection time in the non-volatile memory, the processing proceeds to S602.

In S602, the CPU 202 determines whether or not the power of the printing apparatus 101 is ON. In a case when the power of the printing apparatus 101 is ON, the processing proceeds to S603. In a case when the power of the printing apparatus 101 is OFF, the flow shown in FIG. 6 finishes.

In S603, the CPU 202 determines whether or not the carriage unit 102 can be moved to the cap 501 side, which is the wet cap. Specifically, after the CPU 202 confirms that the moving velocity of the carriage unit 102 to the cap 501 side is less than a predetermined value, the CPU 202 determines whether or not the carriage unit 102 can be moved to the cap 501 side. The case when the moving velocity of the carriage unit 102 to the cap 501 side is less than the predetermined value includes the case when the carriage unit 102 has been stopped.

For example, in a case when while the carriage unit 102 is moving to the cap 508 (dry cap) side, there is contact with a sheet, there is a case when a warped sheet serves as a wall to make it impossible for the carriage unit 102 to move in the traveling direction. In such a case, the CPU 202 determines that the movement to the cap 508 side is not possible.

On the other hand, since there is no obstacle to the movement in the opposite direction to the traveling direction of the carriage unit 102, it is possible to move the carriage unit 102 to the cap 501 (wet cap) side. That is, in a case when there is contact with a sheet during the movement from the cap 501 (wet cap) side to the cap 508 (dry cap) side, it is possible to move the carriage unit 102 to the cap 501 (wet cap) side. In such a case, the CPU 202 determines that the movement to the cap 501 side is possible.

In S603, in a case when the CPU 202 determines that the carriage unit 102 can be moved to the cap 501 side, the processing proceeds to S604. If the CPU 202 determines that the carriage unit 102 cannot be moved to the cap 501 side, the processing proceeds to S605.

In S604, the capping is executed on the printing head 110 by using the cap 501 (wet cap). In a case when the capping completes, the flow shown in FIG. 6 finishes.

In S605, the CPU 202 determines whether or not the carriage unit 102 can be moved to the cap 508 side, which is the dry cap. For example, in a case when there is contact with a sheet while the carriage unit 102 is moving from the cap 508 (dry cap) side to the cap 501 (wet cap) side, the carriage unit 102 can be moved to the cap 508 (dry cap) side.

In S605, in a case when the CPU 202 determines that the carriage unit 102 can be moved to the cap 508 side, the processing proceeds to S606. If the CPU 202 determines that the carriage unit 102 cannot be moved to the cap 508 side, the printing head 110 is not capped, and the flow shown in FIG. 6 ends.

In S606, the capping is executed on the printing head 110 by using the cap 508 (dry cap). In a case when the capping completes, the flow shown in FIG. 6 finishes.

FIG. 7 is a table showing recovery method selection at the time of return from an error such as the anomalous stop of the carriage unit 102. In FIG. 7, the recovery method for the printing head 110 is selected based on the carriage position and the non-operated time.

The carriage positions can be classified into three categories, that is, a dry cap position (the printing head 110 is located over the cap 508), a wet cap position (the printing head 110 is located over the cap 501), and the other.

In addition, the non-operated times can be classified into four categories, that is, less than three hours, less than twenty-four hours, less than seventy-two hours, and seventy-two hours or more. The number of the classification categories is not limited to this.

The cleaning methods include, for example, three types, and can be classified into first cleaning, second cleaning, and third cleaning.

The first cleaning is a cleaning method in which a thickened ink is discharged by the preliminary ejection ejecting the ink from the printing head 110 at a timing other than printing, for example.

The second cleaning is a cleaning method in which an ink inside the printing head 110 (the ink present in the printing head), for example, is discharged by the suction after performing the preliminary ejection.

The third cleaning is a cleaning method in which a cleaning liquid introduces into the printing head 110 to dissolve solidified matters, for example, after the preliminary ejection and the suction. As the method for dissolving solidified matters, the following two methods can be considered. The first method is a method including: filling the cap 501 in a capping state with a cleaning liquid; and dipping the cleaning liquid from the nozzles. The second method is a method including letting the user replace the ink tank with a cleaning liquid tank and introducing a cleaning liquid from a head supply port by the suction.

After the first cleaning, the second cleaning, or the third cleaning is executed, wiping of the nozzle face by using the wiper 503 is performed.

In addition, the first cleaning, the second cleaning, and the third cleaning are such cleaning methods that the cleaning intensity increases in this order. The first, second, and third cleanings described above are an example of cleanings (recovery operations) with different intensities, and the recovery operations of the present disclosure are not limited to these cleanings.

In a case when the capping has been performed at the dry cap position, the evaporation speed is faster than that in a case when the capping has been performed at the wet cap position. For this reason, it is necessary to select a more intense recovery method from a shorter non-operated time than that at the time of non-operation with the wet capping. On the other hand, in a case when the capping has been performed at the dry cap position, since the evaporation speed is slower than in a case of non-operation without the capping, a weaker recovery method than that at the time of non-capping may be selected.

It is also possible to have a plurality of such recovery method selection tables as shown in FIG. 7 in association with the colors of inks. Since solidification (strength of chemical bonds between molecules) varies depending on colors of inks to be used, it becomes possible to reduce an amount of waste ink by executing recovery by using a cleaning method suitable for the each of the color inks to be used.

In addition, it is also possible to have a plurality of such recovery method selection tables as shown in FIG. 7 in association with an environmental temperature or an environmental humidity by installing a temperature sensor and a humidity sensor in the printing apparatus 101. Since the drying of the ink is slower to proceed in an environment with a lower environmental temperature and a higher environmental humidity, it becomes possible to select a cleaning method with a weaker cleaning intensity even in the same carriage position and the non-operated time.

Figure 8:
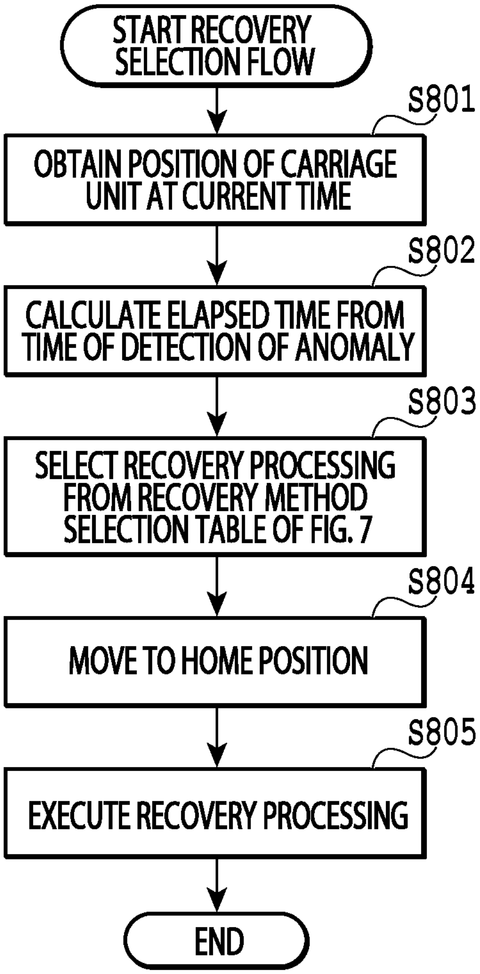
FIG. 8 is a flowchart showing a recovery flow at the time of return.

FIG. 8 is a flowchart showing a flow of selecting the recovery method at the time of return.

The time of return refers to the case when after the anomaly occurs, the anomaly is resolved by the user removing the cause of the anomaly, and a return instruction is sent by operation on the printing apparatus. The return instruction may contain instructions associated with some operation on the printing apparatus such as power ON, cleaning instruction, or print job transmission, for example.

In S801, the CPU 202 obtains the carriage position of the carriage unit 102 at the time of return, and the processing proceeds to S802.

In S802, the CPU 202 calculates an elapsed time from the time of the anomaly detection. Here, the CPU 202 calculates the elapsed time based on the anomaly detection time stored in step S801 as mentioned above and a current time. After the CPU 202 calculates the elapsed time from the time of the anomaly detection, the processing proceeds to S803.

In S803, the CPU 202 selects the recovery processing (cleaning method) from the recovery method selection table shown in FIG. 7, and the processing proceeds to S804.

In S804, the carriage unit 102 is moved to the home position, that is, over the cap 501 (wet cap). After the carriage unit 102 is moved to the home position, the processing proceeds to S805.

In S805, the recovery processing (cleaning method) selected in S803 is executed on the printing head 110, and the flow shown in FIG. 8 finishes.

Since the dry cap can be used in one of the two recovery units by using the configuration of the present embodiment, it becomes possible to reduce the number of components of the printing apparatus 101. In addition, since the printing head 110 is cleaned and recovered by using an appropriate method, occurrence of image failure due to solidification of ink can also be suppressed.

Second Embodiment

In a second embodiment, selection of the capping position in a case when the anomaly occurs during the movement of the carriage unit 102 will be described. Selection of the recovery method depending on the carriage position, the elapsed time, and the presence or absence of ink circulation at the time of recovery will also be described.

The ink circulation, which is a difference from the first embodiment, will be described below.

<Ink Circulation>

Figure 9:
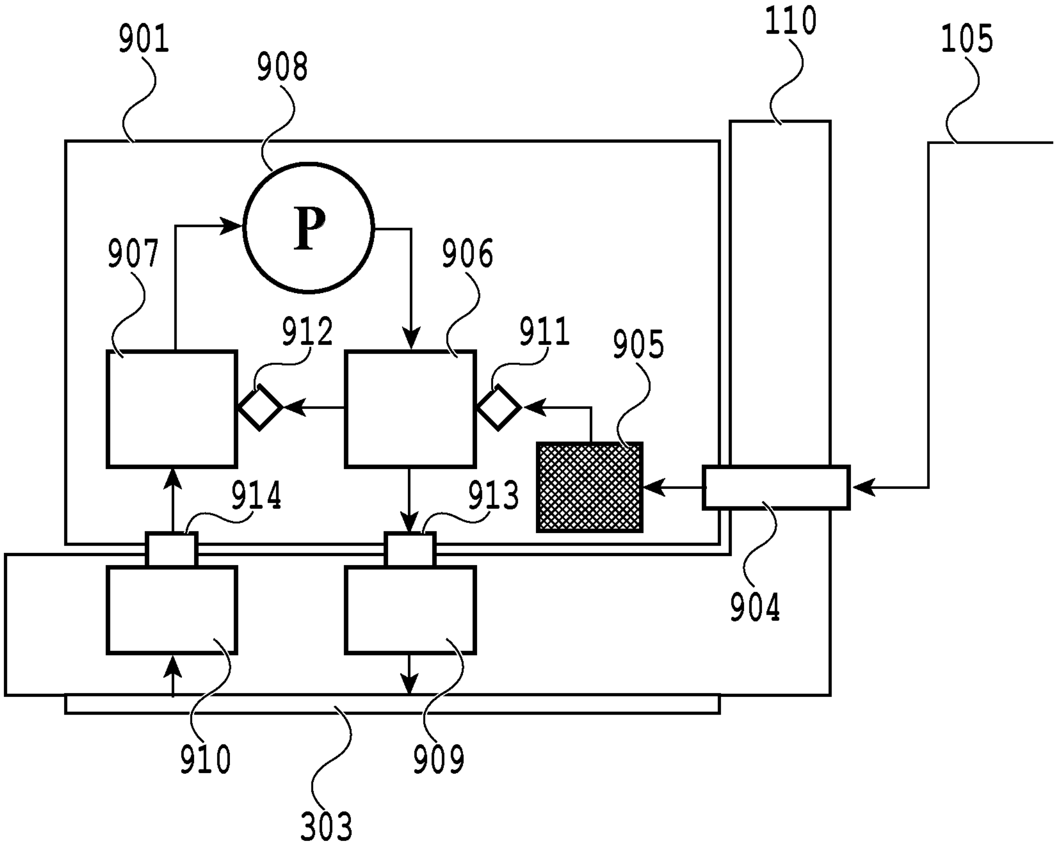
FIG. 9 is a schematic diagram showing a configuration of a printing head and a buffer tank.

FIG. 9 is a schematic diagram showing a configuration of a printing head 110 and a buffer tank 901. Although FIG. 9 is a schematic diagram of a flow path for one color, it is assumed that buffer tanks and flow paths for four colors, that is, cyan, magenta, yellow, and black are configured in a single printing head as mentioned above.

A supply tube 105 is connected to a joint 904 of the printing head 110 through the inside of a carriage unit 102 and communicates with the buffer tank 901. The supplied ink passes through a filter 905, flows through a flow path in the buffer tank 901, and reaches a first pressure chamber 906. The first pressure chamber 906 is connected to another second pressure chamber 907. Another flow path connecting to the first pressure chamber 906 and the second pressure chamber via a circulation pump 908 (flow velocity generating unit) is also provided.

The first pressure chamber 906 and the second pressure chamber 907 have, in inlet ports thereof, valves 911 and 912, which open in a case when a predetermined negative pressure is reached, respectively. The valve 911 is provided in a flow path between the filter 905 and the first pressure chamber 906. The valve 912 is provided in a flow path between the first pressure chamber 906 and the second pressure chamber 907. In addition, the valve 912 of the second pressure chamber opens at a higher negative pressure than the negative pressure at which the valve 911 of the first pressure chamber opens.

In a chip 303, the ink is supplied from the first pressure chamber 906 to supply paths (described later) of one or a plurality of nozzle arrays disposed in the chip 303 via the joint 913 and a common supply path 909 formed in the printing head 110.

Then, the ink that has passed through nozzles 302 passes from a collection path (described later) in the chip 303 through a common collection path 910 formed in the printing head 110 and a joint 914 and is returned to the second pressure chamber 907.

Figure 10:
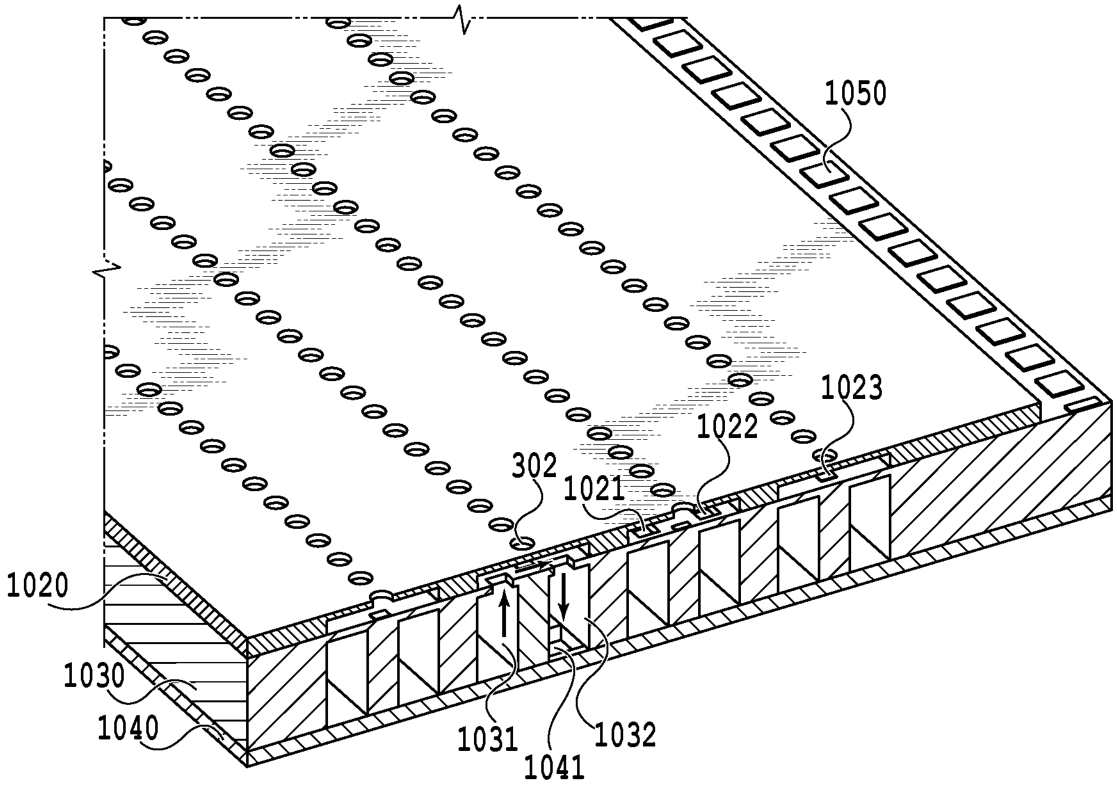
FIG. 10 is a perspective view showing a configuration of nozzles and flow paths of the printing head.
Figure 11:
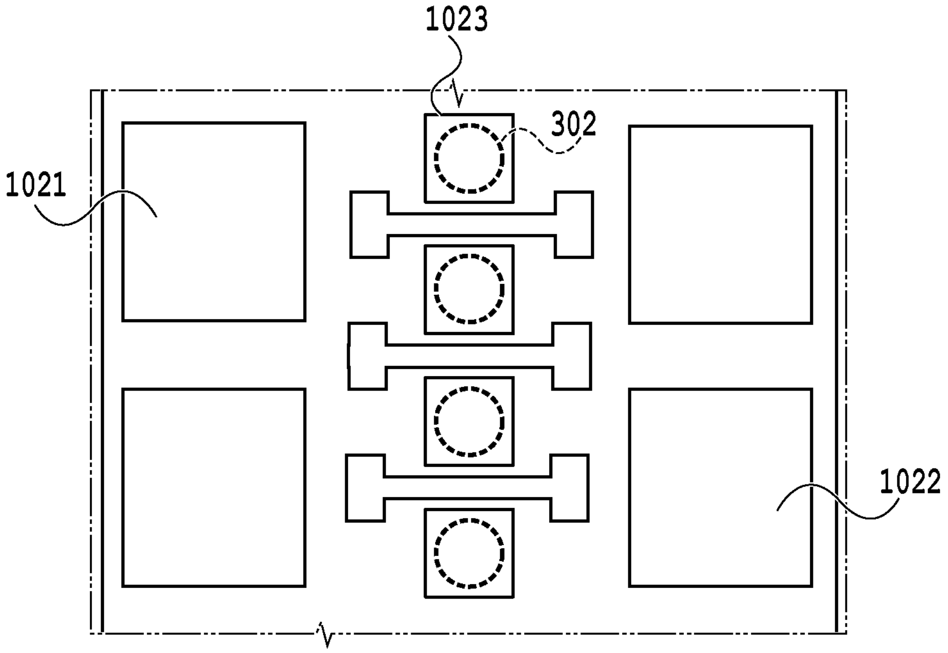
FIG. 11 is a schematic diagram showing a configuration of the nozzles of the printing head.

FIG. 10 and FIG. 11 are diagrams showing a configuration of the nozzle 302 and the flow path formed in the chip 303 and a flow of the ink.

In FIG. 10, the nozzles 302 are formed in an orifice plate 1020 on a surface of the chip 303, and ejection energy generating elements 1023 which generate an ejection energy for ejecting the ink are provided on a substrate 1030 below the orifice plate 1020.

As the ejection energy generating elements 1023, electrothermal conversion elements (heaters) or piezoelectric elements can be used. In a case when heaters are used, bubbles are generated from the ink in the nozzles by the heat generation, and the ink can be ejected from the nozzles 302 by utilizing the bubble generating energy.

In a state where the ink has been supplied, a negative pressure that causes a meniscus to be formed in the nozzle face is maintained. On one side of the nozzles 302, one of the two flow paths, which are an inlet port 1021 and an outlet port 1022, is formed. On the other side of the nozzles 302, the other of the two flow paths is formed.

As shown in FIG. 11, in the present embodiment, the inlet port 1021 and the outlet port 1022 are disposed such that one inlet port 1021 and one outlet port 1022 are provided for every two nozzles. The numbers of the inlet ports 1021 and the outlet ports 1022 may be one each for one nozzle, or one each for more than two nozzles.

The inlet port 1021 and the outlet port 1022 are respectively connected to a supply path 1031 and a collection path 1032 formed along a nozzle array direction. The supply path 1031 and the collection path 1032 are covered with a cover plate 1040 and are connected to the common supply path 909 and the common collection path 910 of the printing head via cover plate openings 1041 on the cover plate 1040. One or more cover plate openings 1041 are provided for each of the supply path 1031 and the collection path 1032. In addition, the number of the cover plate openings 1041 may be the same as or different from the numbers of the supply path 1031 and the collection path 1032.

Next, a method for supplying the ink to the printing head 110 and the buffer tank 901 and a method for circulating the ink in the nozzles 302 in the present embodiment will be described.

As shown in FIG. 9, the ink is pressurized from the ink tank to reach the inside of the printing head 110 via the supply tube 105, passes through the filter 905, and then flows into the flow path in the buffer tank 901. In a state where the inside of the printing head 110 is filled with the ink at such an appropriate negative pressure that a meniscus is maintained in the nozzle face, the valve 911 in the inlet port of the first pressure chamber 906 is in a closed state, so that the ink does not flow into the first pressure chamber 906.

However, in a case when a negative pressure is applied to the nozzle 302 by a suction operation by the cap 501 of the first recovery unit 111, or in a case when the ink is ejected from the nozzle 302, or the like, if the negative pressure in the first pressure chamber 906 becomes a predetermined negative pressure, the valve 911 in the inlet port opens. As the valve 911 in the inlet port opens, the ink flows into the first pressure chamber 906.

As shown in FIG. 9, the first pressure chamber 906 and the second pressure chamber 907 are connected to the circulation pump 908. As the circulation pump 908 is driven, the ink is transferred from the second pressure chamber 907 to the first pressure chamber 906 via the circulation pump 908. This raises the negative pressure in the second pressure chamber 907 to open the valve 912 in the inlet port of the second pressure chamber 907, so that the ink is caused to flow back from the first pressure chamber 906 to the second pressure chamber 907.

At this time, since a difference in pressure is generated between the first pressure chamber 906 and the second pressure chamber 907, the ink passes through the flow path from the first pressure chamber 906 in the order of the common supply path 909→the cover plate opening 1041→the supply path 1031 of each of the nozzle arrays→the inlet port 1021. Then, a part of the ink flows into the nozzles 302.

In addition, the ink passes through the flow path from the nozzles 302 in the order of the outlet port 1022→the collection path 1032→the cover plate opening 1041→the common collection path 910 to return the second pressure chamber 907. That is, the ink in the chip 303 flows in the direction of arrows shown in FIG. 10. The negative pressure and the flow velocity of the ink in the nozzle 302 are adjusted to be within a range of allowing the meniscus to be maintained, by the flow rate of the circulation pump 908, the pressure loss in the flow path between the first pressure chamber 906 and the second pressure chamber 907, and the opening and closing forces of the valves in the inlet ports.

According to the above configuration, the circulation pump 908 is driven to generate the flow in which the ink near the nozzles 302 moves to suppress an increase in ink viscosity due to drying in the nozzles during the printing operation, and thus it becomes possible to prevent the ejection characteristics of the ink from degrading.

<Recovery Flow>

The solidification of the ink in the printing head 110 is caused by aggregation of solid contents due to evaporation of moisture from the nozzles 302. Hence, in a case when the printing head 110 is left in a state where the ink in the printing head 110 circulates and a flow velocity is generated, the solid contents are slower to aggregate even in a case when the moisture evaporates near the nozzle and the time until the ink is solidified becomes longer than the case when the printing head 110 is left without circulation. Therefore, it is possible to recover the printing head 110 by the weaker recovery method (cleaning method) than the case when the ink circulation is not performed even in a case where the non-operated time is long.

Figure 12:
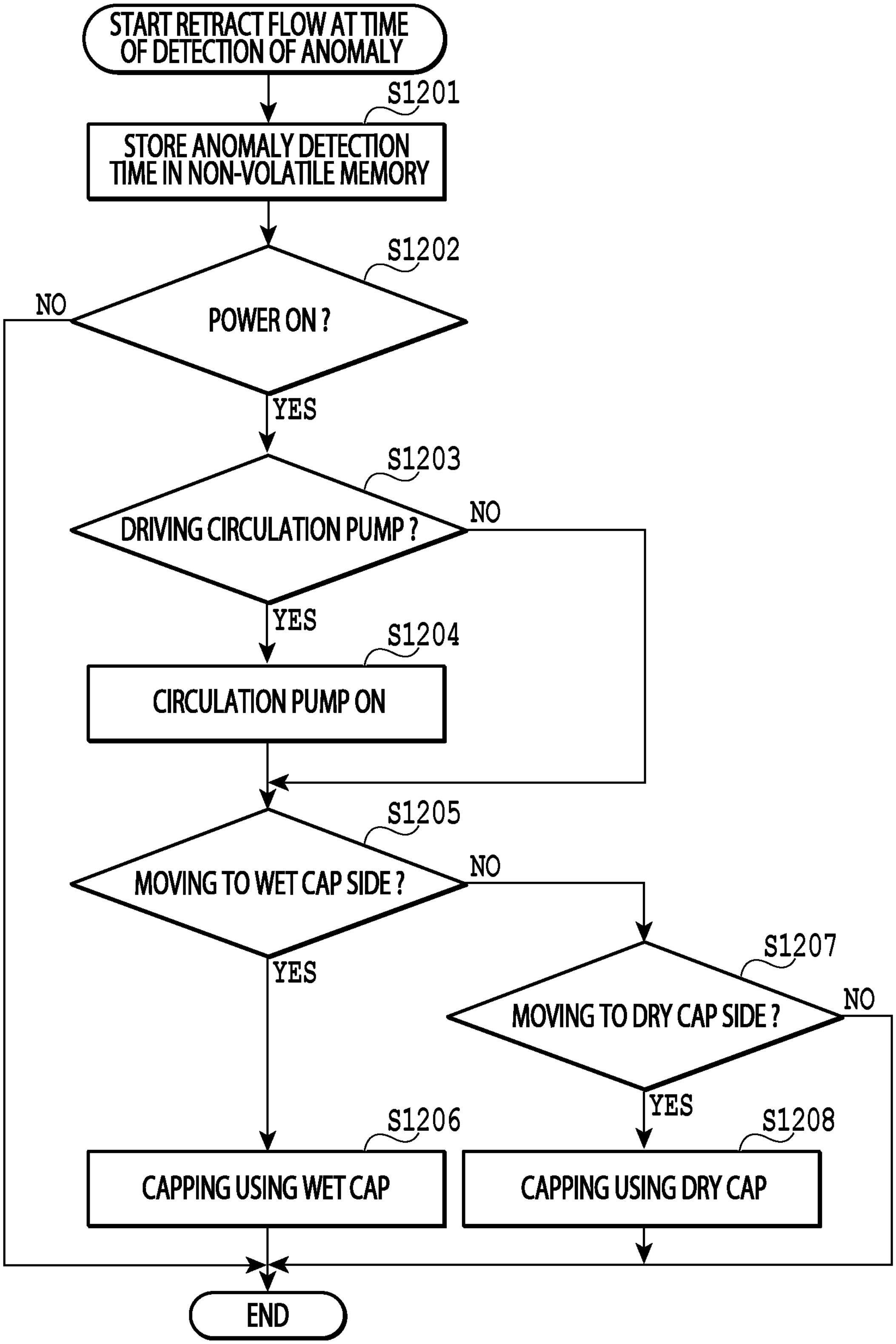
FIG. 12 is a flowchart showing a control flow for retract of a carriage and driving of a circulation pump.

FIG. 12 is a flowchart showing a retract flow of the carriage unit 102 in a case when the anomaly has been detected.

In S1201, the CPU 202 stores an anomaly detection time in the non-volatile memory after the anomaly has been detected. The anomaly detection time is referred to in a case of calculating an elapsed time from the time of the anomaly detection at the time of return of the printing apparatus 101. After the CPU 202 stores the anomaly detection time in the non-volatile memory, the processing proceeds to S1202.

In S1202, the CPU 202 determines whether or not the power of the printing apparatus 101 is ON. If the power of the printing apparatus 101 is ON, the processing proceeds to S1203. If the power of the printing apparatus 101 is OFF, the flow shown in FIG. 12 finishes.

In S1203, the CPU 202 determines whether or not the circulation pump 908 can be driven. In a case when the CPU 202 determines that the circulation pump 908 can be driven, the processing proceeds to S1204. In a case when the CPU 202 determines that the circulation pump 908 cannot be driven, the processing proceeds to S1205.

In S1204, the circulation pump 908 is driven, and the processing proceeds to S1205.

In S1205, the CPU 202 determines whether or not the carriage unit 102 can be moved to the cap 501 side, which is the wet cap. In a case when the CPU 202 determines that the carriage unit 102 can be moved to the cap 501 side, the processing proceeds to S1206. In a case when the CPU 202 determines that the carriage unit 102 cannot be moved to the cap 501 side, the processing proceeds to S1207.

In S1206, the capping is executed on the printing head 110 by using the cap 501 (wet cap). In a case when the capping completes, the flow shown in FIG. 12 finishes.

In S1207, the CPU 202 determines whether or not the carriage unit 102 can be moved to the cap 508 side, which is the dry cap. In a case when the CPU 202 determines that the carriage unit 102 can be moved to the cap 508 side, the processing proceeds to S1208. In a case when the CPU 202 determines that the carriage unit 102 cannot be moved to the cap 508 side, the printing head 110 is not capped, and the flow shown in FIG. 12 finishes.

In S1208, the capping is executed on the printing head 110 by using the cap 508 (dry cap). In a case when the capping completes, the flow shown in FIG. 12 finishes.

FIG. 13 is a recovery method selection table at the time of return after non-operation with the circulation pump 908 being driven. In FIG. 13, like the first embodiment, the recovery method is changed based on the carriage position and the non-operated time. In addition, the categories of the carriage position and the categories of the non-operated time are the same as those in the first embodiment. The numbers of these classification categories are not limited to this.

The types and intensities of the recovery methods (cleaning methods) are also the same as those in the first embodiment. However, these are only an example, and the types and intensities of the recovery methods (cleaning methods) are not limited to these. It is no problem to select types and intensities of the recovery methods (cleaning methods) different from those in the first embodiment.

In a case when the capping has been performed at the dry cap position, the evaporation speed of the ink is faster than that in a case when the capping has been performed at the wet cap position. For this reason, even in the short non-operated time, it is necessary to select a more intense recovery method than that at the time of non-operation with the wet capping. On the other hand, in a case when capping has been made at the dry cap position, since the evaporation speed is slower than in a case of non-operation without the capping, a weaker recovery method than that at the time of the non-capping may be selected.

As compared with the table on the premise of a condition that circulation is not performed, a weaker recovery method is selected as a recovery method after non-operation in a case where the circulation has been performed even for the same categories of carriage position and non-operated time.

It is possible to have a plurality of such recovery method selection tables as shown in FIG. 13 in association with the colors of used inks as in a case of the first embodiment. Since 1 solidification (strength of chemical bonds between molecules) varies depending on colors, it becomes possible to reduce an amount of waste ink by executing recovery by using a cleaning method suitable for each of the color inks.

In addition, it is also possible to have a plurality of such recovery method selection tables as shown in FIG. 13 in association with an environmental temperature or an environmental humidity by installing a temperature sensor and a humidity sensor in the printing apparatus 101. Since the drying of ink is slower to proceed in an environment with a lower environmental temperature and a higher environmental humidity, it becomes possible to select a weaker cleaning method even in the same carriage position and non-operated time.

Figure 14:
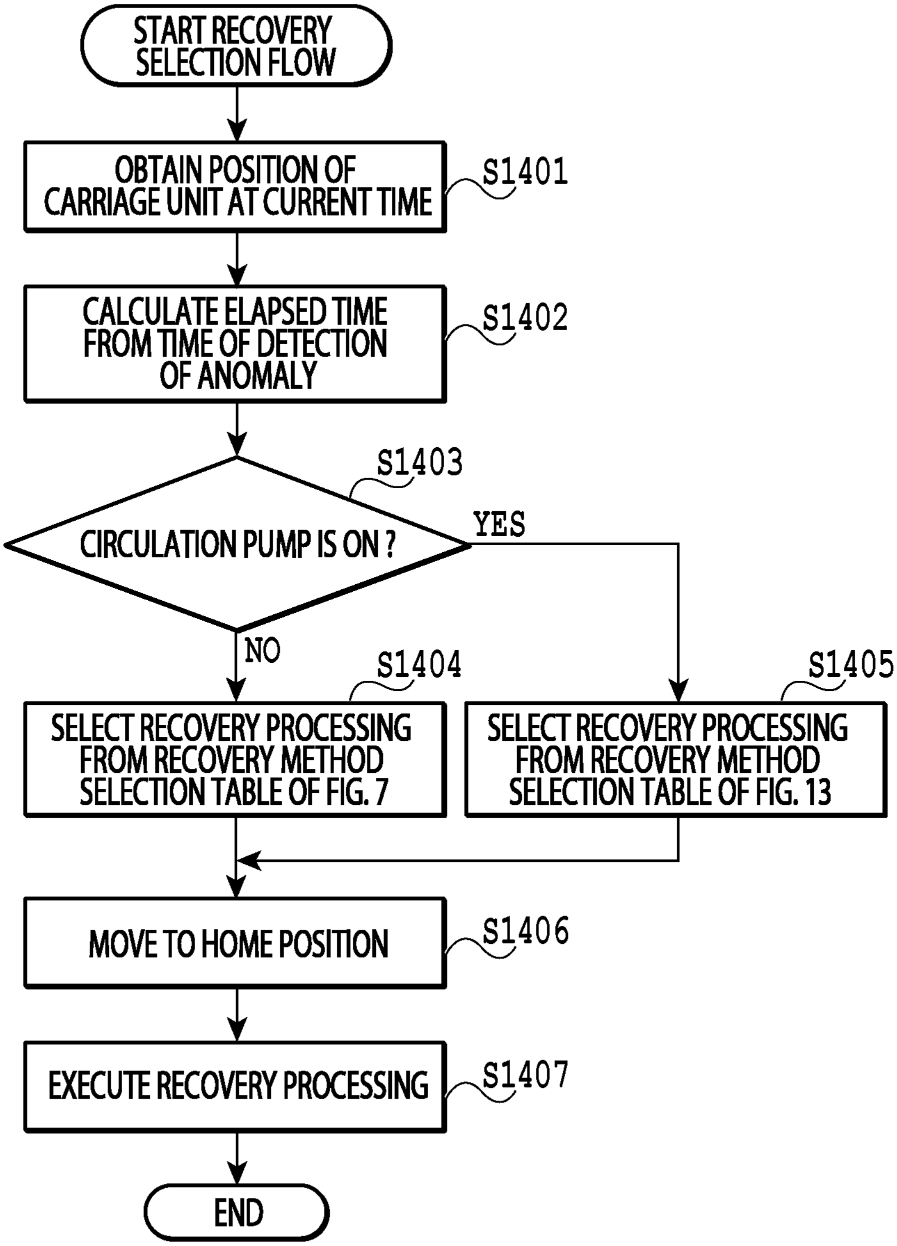
FIG. 14 is a flowchart showing a recovery flow at the time of return in a case where the circulation pump is being driven.

FIG. 14 is a flowchart showing a flow of selecting a recovery method at the time of return.

In S1401, the CPU 202 obtains the carriage position of the carriage unit 102 at the time of return, and the processing proceeds to S1402.

In S1402, the CPU 202 calculates an elapsed time from the time of the anomaly detection. Here, the CPU 202 calculates the elapsed time based on the anomaly detection time stored in step S1401 as mentioned above and a current time. After the CPU 202 calculates the elapsed time from the time of the anomaly detection, the processing proceeds to S1403.

In S1403, the CPU 202 determines whether or not the circulation pump 908 is being driven. In a case when the CPU 202 determines that the circulation pump 908 is being driven, the processing proceeds to S1405. In a case when the CPU 202 determines that the circulation pump 908 is not being driven, the processing proceeds to S1404.

In S1404, the CPU 202 selects recovery processing (cleaning method) from the recovery method selection table shown in FIG. 7, and the processing proceeds to S1406.

In S1405, the CPU 202 selects recovery processing (cleaning method) from the recovery method selection table shown in FIG. 13, and the processing proceeds to S1406.

In S1406, the carriage unit 102 is moved to the home position, that is, over the cap 501 (wet cap). After the carriage unit 102 is moved to the home position, the processing proceeds to S1407.

In S1407, the recovery processing (cleaning method) selected in S1404 or S1405 is executed on the printing head 110, and the flow shown in FIG. 14 finishes.

Since the dry cap can be used in one of the two recovery units by using the configuration of the present embodiment, it becomes possible to reduce the number of components of the printing apparatus 101. In addition, it becomes possible to recover the printing head 110 by using a weaker cleaning method than the method selected in the first embodiment, and thus the amount of waste ink can be reduced.

OTHER EMBODIMENTS

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A printing apparatus comprising:

a carriage configured to move, and to be mounted a printing head, the printing head having a nozzle configured to eject a liquid;

a first cap disposed at one end of a range in which the carriage moves and configured to cap the nozzle;

a second cap disposed at the other end of the range in which the carriage moves and configured to cap the nozzle; and a control unit configured to execute either a first control in which the nozzle is capped by the first cap or a second control in which the nozzle is capped by the second cap, in a case when the carriage has anomalously stopped during printing using the printing head, wherein a recovery operation on the printing head after the first control is executed is different from a recovery operation on the printing head after the second control is executed, and wherein the recovery operation includes at least one of:

preliminary ejection to eject the liquid from the nozzle at a timing other than printing, suctioning the liquid inside the first cap in a state where the nozzle is capped by the first cap, and dipping the nozzle into the liquid supplied into the first cap.

2. The printing apparatus according to claim 1, further comprising a supply unit configured to supply the liquid into the first cap.

3. The printing apparatus according to claim 1, further comprising a wiper configured to wipe a nozzle face of the printing head.

4. The printing apparatus according to claim 1, further comprising a conveyance roller configured to convey a print medium, wherein the carriage anomalously stops in a case when a jam of the print medium conveyed by the conveyance roller has occurred.

5. The printing apparatus according to claim 1, further comprising a temperature sensor configured to sense an environmental temperature, wherein a different recovery operation is executed depending on the environmental temperature sensed by the temperature sensor.

6. The printing apparatus according to claim 1, further comprising a humidity sensor configured to sense an environmental humidity, wherein a different recovery operation is executed depending on the environmental humidity sensed by the humidity sensor.

7. The printing apparatus according to claim 1, wherein a wet state of the first cap is different from the wet state of the second cap.

8. A printing apparatus comprising:

a carriage configured to move, and to be mounted a printing head, the printing head having a nozzle configured to eject a liquid;

a first cap disposed at one end of a range in which the carriage moves and configured to cap the nozzle;

a second cap disposed at the other end of the range in which the carriage moves and configured to cap the nozzle; and a control unit configured to execute either a first control in which the nozzle is capped by the first cap or a second control in which the nozzle is capped by the second cap, in a case when the carriage has anomalously stopped during printing using the printing head, wherein a recovery operation on the printing head after the first control is executed is different from a recovery operation on the printing head after the second control is executed, and wherein a cleaning intensity of the recovery operation in a case when the first control is executed is lower than that of the recovery operation in a case when the second control is executed.

9. The printing apparatus according to claim 8, wherein a wet state of the first cap is different from the wet state of the second cap.

10. The printing apparatus according to claim 8, further comprising a supply unit configured to supply the liquid into the first cap.

11. The printing apparatus according to claim 8, further comprising a wiper configured to wipe a nozzle face of the printing head.

12. A printing apparatus comprising:

a carriage configured to move, and to be mounted a printing head, the printing head having a nozzle configured to eject a liquid;

a first cap disposed at one end of a range in which the carriage moves and configured to cap the nozzle;

a second cap disposed at the other end of the range in which the carriage moves and configured to cap the nozzle;

a control unit configured to execute either a first control in which the nozzle is capped by the first cap or a second control in which the nozzle is capped by the second cap, in a case when the carriage has anomalously stopped during printing using the printing head; and a pump configured to collect the liquid that is not ejected from the nozzle, wherein a recovery operation on the printing head after the first control is executed is different from a recovery operation on the printing head after the second control is executed, and wherein the pump is operated in a case when the carriage has anomalously stopped during printing using the printing head.

13. The printing apparatus according to claim 12, wherein the recovery operation includes at least one of:

preliminary ejection to eject the liquid from the nozzle at a timing other than printing, suctioning the liquid inside the first cap in a state where the nozzle is capped by the first cap, and dipping the nozzle into the liquid supplied into the first cap.

14. The printing apparatus according to claim 12, wherein a wet state of the first cap is different from the wet state of the second cap.

15. The printing apparatus according to claim 12, further comprising a supply unit configured to supply the liquid into the first cap.

16. The printing apparatus according to claim 12, further comprising a wiper configured to wipe a nozzle face of the printing head.

17. A printing apparatus comprising:

a carriage configured to move, and to be mounted a printing head, the printing head having a nozzle configured to eject a liquid;

a first cap disposed at one end of a range in which the carriage moves and configured to cap the nozzle;

a second cap disposed at the other end of the range in which the carriage moves and configured to cap the nozzle;

a control unit configured to execute either a first control in which the nozzle is capped by the first cap or a second control in which the nozzle is capped by the second cap, in a case when the carriage has anomalously stopped during printing using the printing head, wherein a recovery operation on the printing head after the first control is executed is different from a recovery operation on the printing head after the second control is executed, wherein the printing head includes a plurality of nozzles corresponding to a plurality of color liquids, and wherein a different recovery operation is executed depending on each of the plurality of the color liquids.

18. The printing apparatus according to claim 17, wherein a wet state of the first cap is different from the wet state of the second cap.

19. The printing apparatus according to claim 17, further comprising a supply unit configured to supply the liquid into the first cap.

* * * * *